United States Patent
Ruh et al.

(10) Patent No.: US 10,646,970 B2
(45) Date of Patent: May 12, 2020

(54) METHOD FOR ASSEMBLING CONTROL ARRANGEMENT OF AN EXHAUST-GAS TURBOCHARGER

(71) Applicant: BorgWarner Inc., Auburn Hills, MI (US)

(72) Inventors: Matthias Ruh, Offenheim (DE); Michael Stilgenbauer, Bolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 75 days.

(21) Appl. No.: 15/904,407

(22) Filed: Feb. 25, 2018

(65) Prior Publication Data

US 2018/0193967 A1      Jul. 12, 2018

Related U.S. Application Data

(63) Continuation-in-part of application No. 15/119,764, filed as application No. PCT/US2015/029138 on May 5, 2015, now Pat. No. 10,487,724.

(30) Foreign Application Priority Data

May 8, 2014    (DE) .................... 20 2014 003 918 U
Sep. 17, 2014   (DE) .................... 20 2014 007 538 U

(51) Int. Cl.
*B23K 1/00*         (2006.01)
*B23P 23/04*        (2006.01)
(Continued)

(52) U.S. Cl.
CPC .............. *B23P 23/04* (2013.01); *B23P 15/00* (2013.01); *F01D 17/20* (2013.01); *F02B 37/183* (2013.01);
(Continued)

(58) Field of Classification Search
CPC .......... B23P 23/04; B23P 15/00; F01D 17/20; F02C 6/12; F02B 37/24; F02B 37/183;
(Continued)

(56) References Cited

U.S. PATENT DOCUMENTS 2,063,707 A * 12/1936 Soderberg ............... F01D 9/047
                                                          29/889.22
2002/0121259 A1* 9/2002 Mizutani .............. B23K 20/129
                                                          123/188.8

(Continued)

FOREIGN PATENT DOCUMENTS

CN      101960117 A     1/2011
JP      01179132 U     12/1989

OTHER PUBLICATIONS

European Search Report issued in European Application No. 18173594.5 dated Sep. 4, 2018.

(Continued)

*Primary Examiner* — Kiley S Stoner
(74) *Attorney, Agent, or Firm* — Eric L. Doyle; Stephan A. Pendorf; Patent Central LLC

(57) ABSTRACT

A boost control device for a turbocharger, assembled at room temperature, may not be geometrically optimal at turbocharger operating temperature. The geometric deviation in the boost control device introduced by the heating of the turbocharger to operating temperature, or during welding of the boost control device, is corrected by producing a first turbocharger at room temperature, determining the geometry of the deviation at operating temperature, producing a distance element that will introduce an equal and opposite deviation, introducing the equal and opposite deviation via the distance element in second and subsequent turbocharg- (Continued)

ers, whereby thermal deviation and corrective deviation offset so that the turbocharger is geometrically accurate at operating temperature.

20 Claims, 11 Drawing Sheets

(51) Int. Cl.
  *F02B 37/18* (2006.01)
  *F02B 37/24* (2006.01)
  *F02C 6/12* (2006.01)
  *B23P 15/00* (2006.01)
  *F01D 17/20* (2006.01)
  *B23K 101/00* (2006.01)

(52) U.S. Cl.
  CPC ............... *F02B 37/24* (2013.01); *F02C 6/12* (2013.01); *B23K 2101/001* (2018.08); *F05D 2220/40* (2013.01); *F05D 2230/232* (2013.01); *F05D 2230/60* (2013.01); *F05D 2230/90* (2013.01); *Y02T 10/144* (2013.01)

(58) Field of Classification Search
  CPC ............... Y02T 10/144; F05D 2230/60; F05D 2230/232; F05D 2220/40; F05D 2230/90
  See application file for complete search history.

(56) References Cited

U.S. PATENT DOCUMENTS

| | | | |
|---|---|---|---|
| 2007/0248463 A1* | 10/2007 | Bogue | F01D 5/005 416/219 R |
| 2011/0000209 A1 | 1/2011 | Boening et al. | |
| 2013/0287552 A1* | 10/2013 | House | F01D 11/003 415/170.1 |
| 2014/0047849 A1* | 2/2014 | Kramer | F02K 1/80 60/796 |
| 2016/0040543 A1* | 2/2016 | Stastny | F01D 9/023 60/796 |
| 2017/0058761 A1* | 3/2017 | Stilgenbauer | F02B 37/183 |
| 2018/0023462 A1* | 1/2018 | Hahn | F02B 37/186 60/602 |
| 2018/0023463 A1* | 1/2018 | Kemona | F02B 37/186 29/890.08 |
| 2018/0045105 A1* | 2/2018 | Tomanec | F01D 17/105 |

OTHER PUBLICATIONS

Office Action issued in European Application No. 18173594.5 dated Sep. 24, 2018.

Chinese Office Action (with English language translation) dated Aug. 8, 2018, in Chinese Application No. 201580010049.8.

* cited by examiner

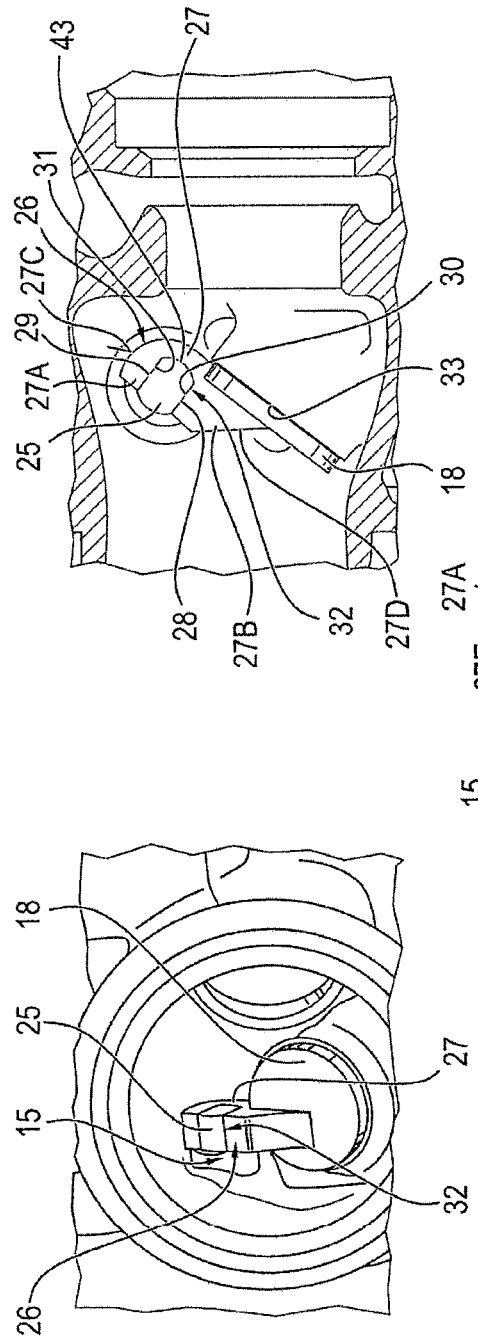
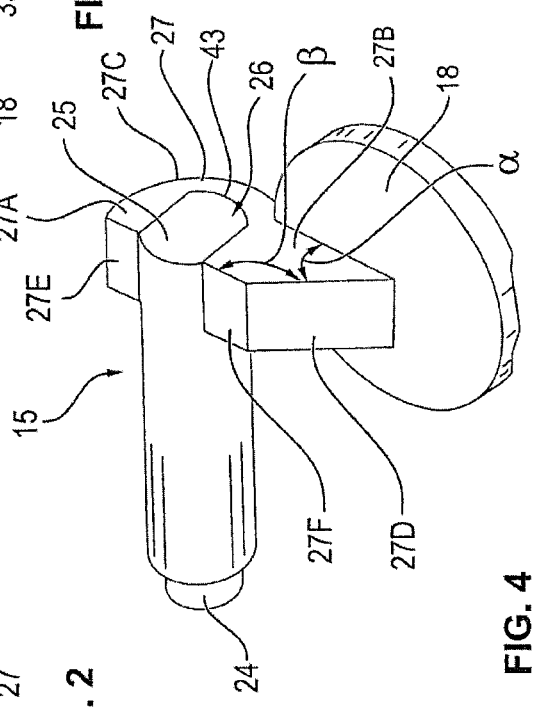
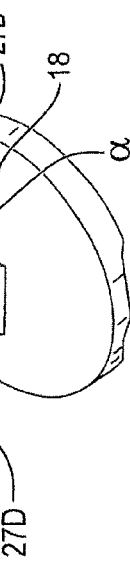
FIG. 2
FIG. 3
FIG. 4

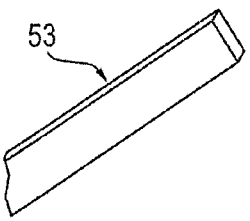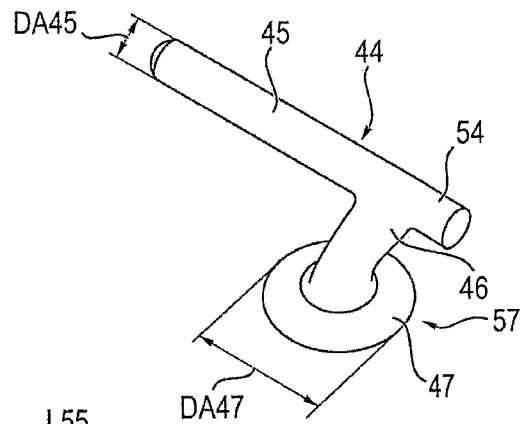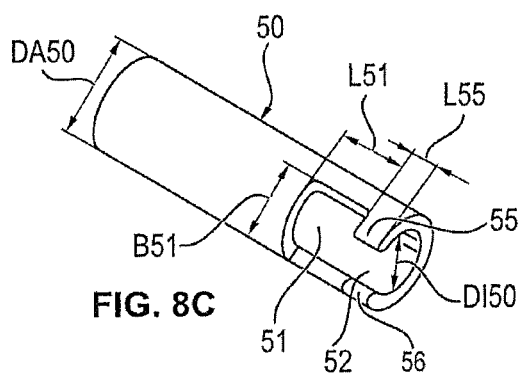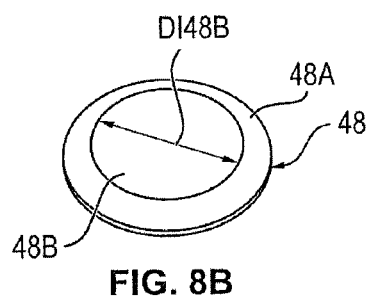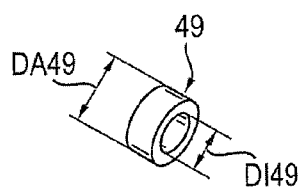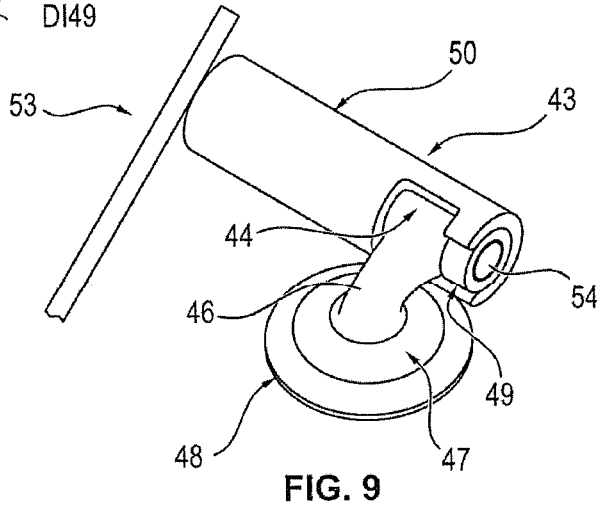

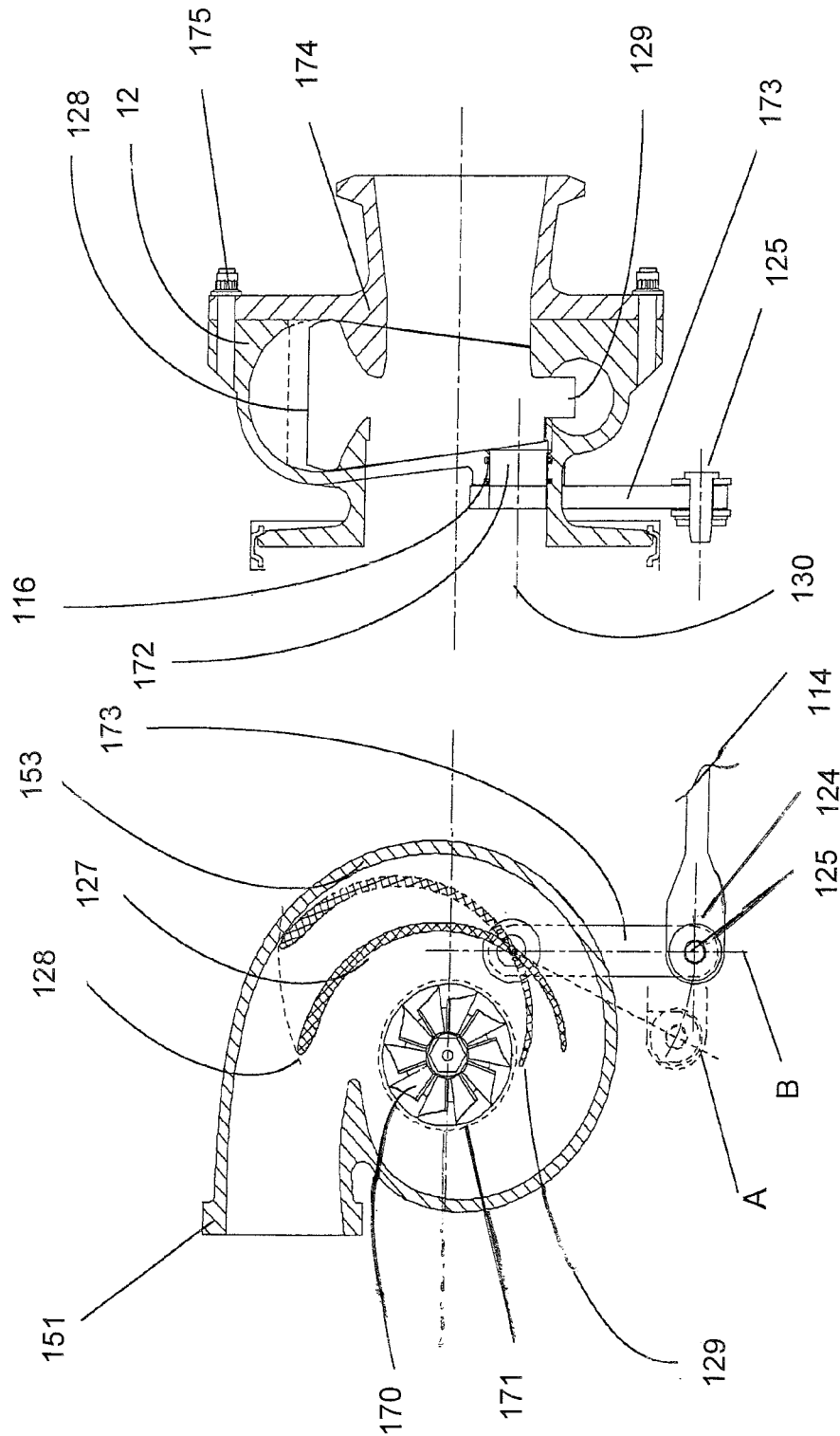

METHOD FOR ASSEMBLING CONTROL ARRANGEMENT OF AN EXHAUST-GAS TURBOCHARGER

BACKGROUND OF THE INVENTION

Field of the Invention

The invention relates to a method for assembling a control arrangement of an exhaust turbocharger.

Description of the Related Art

Turbochargers use the exhaust flow from the engine exhaust manifold to drive a turbine wheel, which is located in the turbine housing. Once the exhaust gas has passed through the turbine wheel and the turbine wheel has extracted energy from the exhaust gas, the spent exhaust gas exits the turbine housing and is ducted to the vehicle downpipe and usually to after-treatment devices such as catalytic converters, particulate traps, and $NO_x$ traps.

The turbocharger may include a waste as a control arrangement for regulating the maximum boost pressure in the turbocharger system. A control arrangement of said type is known from DE 10 2009 048 125 A1. The turbine volute is fluidly connected to the turbine exducer by a bypass duct. Flow through the bypass duct is controlled by the wastegate valve. Because the inlet of the bypass duct is on the inlet side of the volute, which is upstream of the turbine wheel, and the outlet of the bypass duct is on the exducer side of the volute, which is downstream of the turbine wheel, flow through the bypass duct, when in the bypass mode, allows excess exhaust pressure to bypass the turbine wheel, thus not powering the turbine wheel.

An internal wastegate includes a built-in bypass valve and passage within the turbocharger housing. The bypass valve comprises a valve seat and a control means in the form of a valve disk and shaft. The valve disk and shaft form an assembly.

To operate the wastegate, an actuating or control force must be transmitted from outside the turbine housing, through the turbine housing, to the wastegate valve inside the turbine housing. The wastegate shaft extends through the turbine housing. Outside the turbine housing an actuator is connected to a wastegate arm via a linkage, and the wastegate arm is connected to the wastegate shaft. Inside the turbine housing, the shaft is connected to the wastegate valve disk. Actuating force from the actuator is translated into rotation of the wastegate shaft, moving the wastegate disk inside of the turbine housing. The wastegate shaft rotates in a cylindrical bushing, or directly contacts the turbine housing.

A more sophisticated boost control device is a VTG device (the general term for variable turbine geometry, used herein to include variable geometry turbine (VGT), variable nozzle turbine (VNT), or, simply, variable geometry (VG)). Some of these turbochargers have rotating vanes, while others have sliding planar or cylindrical sections. VTG turbochargers with adjustable guide vanes rotatably connected to a pair of vane rings and/or a nozzle wall are adjusted between a minimum open position and a maximum open position to control the exhaust gas backpressure and the turbocharger speed by modulating the exhaust gas flow to the turbine wheel. The vanes can be rotatably driven by vane arms engaged in slots in a unison ring. An actuator outside the turbine housing is coupled to a first lever arm, which is fixed to an outside end of a shaft which passes through the turbine housing and has a second lever arm fixed to an internal end of the shaft. A control force transmitted from an actuator outside the turbine housing, through the first lever arm, rotates the shaft, and the second lever arm, which is engaged in a slot in the unison ring inside the turbine housing. VTG turbochargers have a large number of very expensive alloy components which must be assembled and positioned in the turbine housing so that the guide vanes remain properly positioned with respect to the exhaust supply flow channel and the turbine wheel over the range of thermal operating conditions to which they are exposed. The outside of the turbine housing faces ambient air temperature while the volute surfaces contact exhaust gases ranging from 740° C. to 1050° C. depending on the fuel used in the engine. The temperature conditions force the use of exotic alloys in all internal components. These are very expensive to procure, machine, and weld (where required). Since the VTG design can change turbocharger speed very quickly, the assembly of the VTG mechanism must be very precise. This translates to expensive actuators and expensive thermal resistant materials. While VTGs of various types and configurations have been adopted widely to control both turbocharger boost levels and turbine backpressure levels, the cost of the hardware and the cost of implementation are high.

U.S. Pat. No. 8,585,355, the disclosure of which is incorporated herein by reference, discloses a simplified, low cost, turbine flow controlling device, using a sliding gate, with an actuator to control exhaust flow to multiple volutes, which volutes have perforated transverse divider walls. By moving the sliding gate from a closed position through a first displacement to a second position and then from the second position through a displacement to a third position, each a discreet movement, by a simple actuator (see FIG. 9B of said patent), an increasing number of volutes are opened for flow from the exhaust manifold, via the volutes with perforated transverse divider walls, to the turbine wheel, without the attenuation of pulse energy usually seen in VTGs, at a cost lower than that of a rotating vane VTG.

In each control device, it is essential that the actuator, via the translated motions described above, be able to control the wastegate or VTG mechanism to thereby control flow to the turbine wheel in an accurate, repeatable, non-jamming manner.

It has however been discovered in practice that sometimes, even if the wastegate shaft-and-valve-disk assembly is oriented to the valve seat during manufacture to form a perfect gas-tight seal, or the VTG mechanism is perfectly adjusted during the manufacturing process, nevertheless during operation of a turbocharger there is a gas leak in the wastegate valve or a displacement of the VTG mechanism, particularly in the fully closed position, from the intended position.

It is therefore an object of the present invention to provide a method for assembling a control arrangement of an exhaust turbocharger which permits an improved sealing action between wastegate valve disk and valve seat, or between VTG blades or sliding mechanism, at operating temperatures.

BRIEF SUMMARY OF THE INVENTION

It is provided according to a first embodiment of the invention that the valve disk and the shaft of a wastegate mechanism are initially separate components. During assembly, in order to improve the sealing action between valve disk and valve seat, the valve disk is held firmly with sealing action against the valve seat. Thus held, the valve disk is connected, in particular welded, to the shaft. In this way, manufacturing and assembly tolerances can be compensated to attain a perfected sealing action—at room temperature.

However, it has been discovered in practice that occasionally even when the manufacturing process is performed perfectly, an imperfect seal and thus a gas leak are evident during operation.

It has been proposed by the inventors that there may sometimes be a difference between the thermal rate of expansion of the turbine housing, on the one hand, and the shaft-and-valve-disk assembly or VTG mechanism, on the other hand. This leads to the problem that an assembly manufactured at room temperature with precise alignment for forming an effective seal between the turbine housing valve seat and disk of the shaft-and-valve-disk assembly, or for accurate setting of the minimum open position at room temperature, may not seal perfectly or set at the minimum open position at turbocharger operating temperatures, e.g., 1050° C.

In order to compensate for this problem, it is proposed in accordance with the present invention that the control arrangement of an exhaust-gas turbocharger be assembled by a method comprising the steps:

manufacturing, at room temperature, a first turbocharger including an actuator outside a turbine housing, a boost control device inside a turbine housing, and a shaft for transmitting force from the actuator through the turbine housing to the boost control device, heating the thus manufactured first turbocharger to a turbocharger operating temperature, determining the geometry of any gap or deviation between an element of the boost control device in the actual (ist) position and the target (soll) position in the heated turbocharger, producing a distance element which will position the element of the boost control device displaced an equal and opposite displacement in the direction or orientation opposite to the gap or deviation, manufacturing a subsequent turbocharger having the same components as the first turbocharger, including inserting the distance element between the turbine housing and boost control device, holding the holding the boost control device firmly against the distance element, and connecting, in particular welding, the thus firmly held boost control device to the shaft.

In a wastegate boost control embodiment of the invention, it is proposed that the control arrangement of an exhaust-gas turbocharger be assembled by a method comprising the steps:

assembling, at room temperature, a first turbocharger with wastegate arrangement by a process including assembling an actuator outside a turbine housing, a boost control device inside the turbine housing, and a shaft for transmitting force from the actuator through the turbine housing to the boost control device, holding the valve disk firmly with sealing action against the valve seat, and connecting, in particular welding, the thus firmly held valve disk to the shaft heating the thus manufactured first turbocharger to an operating temperature, determining the geometry of any gap between the valve seat and valve disk at the operating temperature, producing a distance element which will orient the valve disk relative to the valve seat equal and opposite to the determined gap manufacturing a subsequent turbocharger having the same components as the first turbocharger, including inserting the distance element between valve seat and valve disk, holding the valve disk firmly with sealing action against the distance element, and connecting, in particular welding, the thus thinly held valve disk to the shaft.

In a VTG embodiment of the invention, it is proposed that the control arrangement of an exhaust-gas turbocharger be assembled by a method comprising the steps:

manufacturing, at room temperature, a first turbocharger with a VTG device as boost control device, for example a rotating vane or a slide gate as boost control mechanism, by a process including assembling the boost control device, applying actuating force to position the boost control device the to the minimum open position or the closed position, and connecting, in particular welding, the actuating shaft to the VTG mechanism or slide gate, heating the thus manufactured first turbocharger to an operating temperature, determining the geometry of any gap between the VTG vanes or slide gate of the boost control device in the actual (ist) position and the target (soll) position in the heated turbocharger, producing a distance element which when placed between the VTG mechanism and turbine housing will orient the VTG mechanism an equal and opposite distance or orientation to the determined gap, manufacturing a subsequent turbocharger having the same boost control components as the first turbocharger, including inserting the distance element between VTG rotary vane mechanism and turbine housing or slide gate and turbine housing, holding the boost control device firmly against the distance element, and connecting, in particular welding, the thus firmly held distance element to the shaft.

Obviously, when the first turbocharger is manufactured with the boost control device in the optimal position at room temperature, the boost control device may shift position relative to the shaft and relative to the desired (soll) position as the turbocharger is heated to operating temperature, due to differential thermal expansion between turbine housing and the boost control device, or due to warping or bending of e.g. a cranked shaft or actuating arm. As the geometry of a gap or displacement is determined, a distance element introducing an equal and opposite ("corrective") displacement to the boost control device prior to welding will have the net effect that the displacement introduced by the distance element and the displacement produced as the turbocharger is heated to operating temperature perfectly cancel each other out.

It is also possible that a boost control device such as a wastegate disk may be positioned accurately and then welded to the actuating shaft, but due to the heat introduced during the welding, may be malpositioned after the welding process. By the same process, the gap or malposition may be determined in a cold turbocharger, preferably in an operating temperature turbocharger, and this malposition geometry can be used to fashion a distance element for positioning the valve disk an equal and opposite distance or orientation, whereby the misalignment or malpositioning caused by the welding is "corrected" by the offset introduced by the distance element.

It might seem contrary to popular wisdom to manufacture a turbocharger with a gap between valve seat and valve disk and thus guaranteed to leak hot exhaust gas on engine startup. However, in practice, at engine start-up the wastegate is usually opened so that hot engine exhaust can bypass the turbocharger. Thereby, heat from the exhaust gas is effectively diverted to the catalytic converter and used to bring the catalyst up to operating temperature.

In a particularly preferred embodiment, the connecting means preferably has a multiplicity of components, by means of which it is possible to carry out adaptations to particular installation situations or configurations of the control arrangements of the turbocharger.

In particular, it is possible for the connecting means to comprise a spherical segment which can be connected to the second end region of the shaft which is arranged within the bearing housing.

In this embodiment, the connecting means furthermore advantageously has an inner lever by means of which the spherical segment and thus the second end region, arranged within the bearing housing, of the shaft can be connected to the valve disk.

In a further particularly preferred embodiment, the inner lever may comprise two lever sections. In this case, one of the lever sections may be of cranked fatal, preferably so as to be cranked by 90°, and may either directly adjoin a second spherical segment, which is connectable to the valve disk, or be connected to said second spherical segment via a second lever section.

The provision of a second spherical segment which can be inserted into a receiving recess, of complementary form, of the valve disk, yields the advantage that the assembly process is particularly straightforward even in the presence of relatively large tolerances, and the achievable sealing action at the valve seat can be further improved.

It is furthermore an object of the present invention to specify methods for assembling a control arrangement of an exhaust-gas turbocharger, by means of which methods it is possible to achieve an improved sealing action between valve disk and valve seat of the control arrangement, which method is furthermore technically more straightforward to carry out.

According to the invention, the individual parts of the control arrangement are initially produced in the form of a bushing, a shaft, a valve disk, an intermediate piece and an outer lever.

For the assembly of the control arrangement, it is initially the case that the bushing is inserted, in particular pressed, into a recess of the turbine housing.

After the insertion of the bushing, the shaft is inserted into the bushing.

In the subsequent step, the valve disk is placed against a wastegate opening of the turbine housing, and an intermediate piece is mounted onto an end of the shaft. The mounted intermediate piece is connected, in particular welded, to the end of the shaft, wherein, in a particularly preferred embodiment, a spot weld is initially formed, and then those further regions between the intermediate piece and the end of the shaft that are accessible to the welding device are filled with further welds.

After said connection of the intermediate piece to the shaft, an angle between the outer lever and the shaft relative to the valve disk is adjusted and the lever is fastened, in particular welded, to the shaft.

The lever is thereupon pulled on in the closing direction of the valve disk, wherein, in other words, the valve disk is pressed against the valve seat. In this state, in the final method step, the valve disk is connected, in particular welded, to a spherical segment of the shaft, wherein in turn, in a particularly preferred embodiment, a spot weld is initially formed before further welding is performed.

Once the turbocharger has been manufactured in the "conventional" way, the turbocharger is brought up to operating temperature, and the gap between the actual (ist) position of the boost control device and the desired (soll) position of the boost control device is determined. From this gap, an equal and opposite gap is defined, and a distance element is constructed which will provide this equal and opposite gap.

Then at least a second turbocharger is manufactured by a process similar to the first turbocharger, but involving inserting the distance element between the boost control device and turbine housing, in particular between the valve disk and the valve seat, prior to welding of the valve disk to the wastegate shaft.

By introducing this equal-and-opposite "corrective" offset, the displacement due to thermal expansion or due to welding is perfectly offset by the introduced offset, and as a result the valve disk seats perfectly in the valve seat once the second turbocharger is in the operating temperature. The same corrective offset can be used on every subsequent turbocharger manufactured from the same components.

BRIEF DESCRIPTION OF THE SEVERAL VIEWS OF THE DRAWINGS

Further details, advantages and features of the present invention can be found in the following description of exemplary embodiments with reference to the drawing, in which:

FIGS. 2 and 3 show perspective views of the valve disk and of the shaft from different viewing directions.

FIG. 4 shows a perspective illustration of the shaft and of the valve disk,

FIGS. 8A-8E show individual components of a further embodiment of the control arrangement according to the invention, FIG. 9 shows the control arrangement composed of the components as per FIGS. 8A to 8E in the fully assembled state, FIGS. 13a and 13b illustrate in two views an alternative embodiment of the invention wherein the flow of exhaust gas to the turbine wheel is controlled by the rotation of a pivoting transverse divider wall.

DETAILED DESCRIPTION OF THE INVENTION

First, the steps of making various first wastegated turbochargers—without the distance element—is described.

Figure 1:
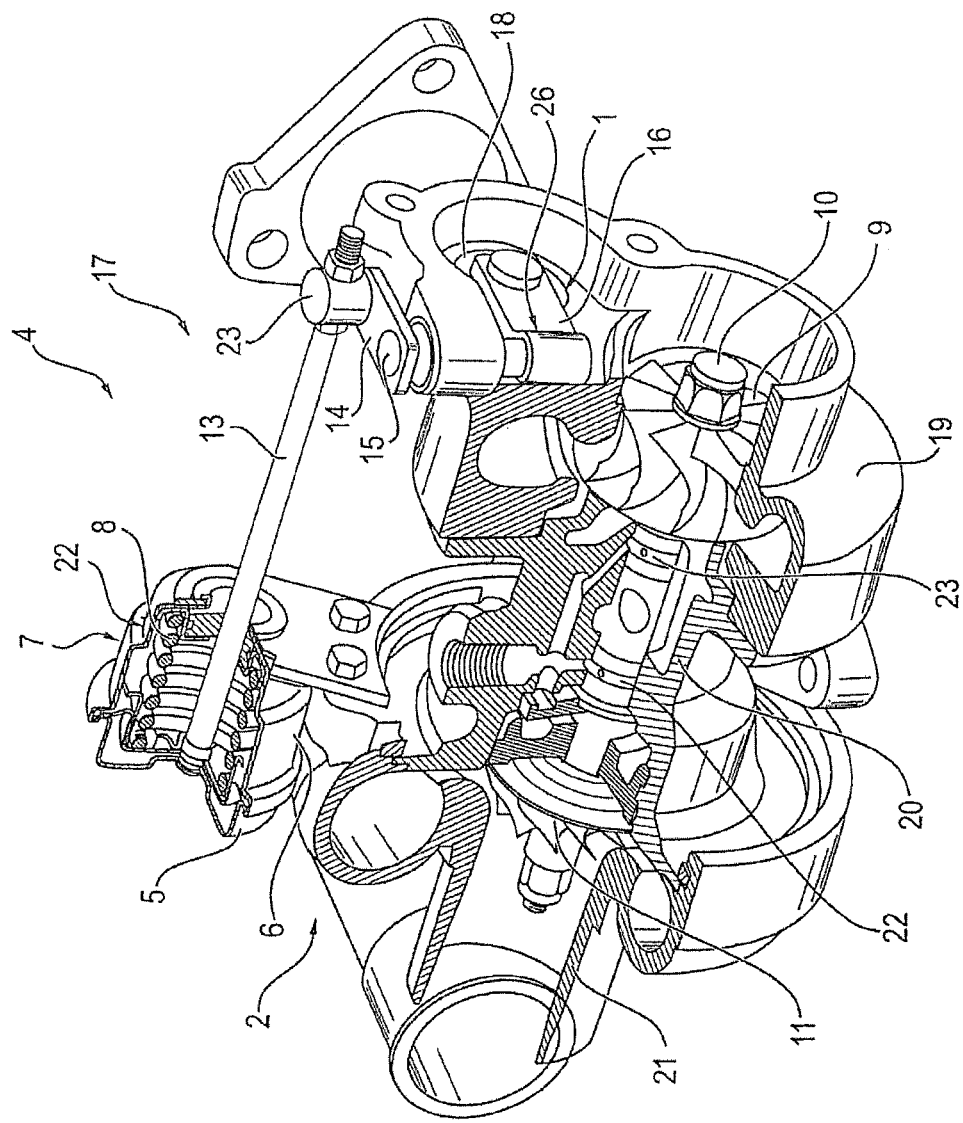
FIG. 1 shows a perspective sectional illustration of an embodiment of an exhaust-gas turbocharger according to the invention.

FIG. 1 is a perspective illustration of an embodiment of an exhaust-gas turbocharger 4 according to the invention, which comprises a charger housing 2. The charger housing 2 is assembled from a turbine housing 19, a bearing housing 20 and a compressor housing 21, which are in each case connected to one another as shown in detail in FIG. 1.

The exhaust-gas turbocharger 4 is equipped with a control arrangement 1, which may be either a wastegate valve arrangement or a regulating valve arrangement. FIG. 1 illustrates a wastegate valve arrangement as a control arrangement 1. Said control arrangement 1 accordingly has a shaft 15 which has a first end region 24 which is visible in FIG. 4 and which is arranged outside the (in this case) turbine housing 19 and to which an outer lever 14 is fixed. The shaft 15 furthermore has a second end region 25 arranged within the turbine housing 19. Furthermore, in the embodiment illustrated in FIG. 1, a control means 18 in the form of a valve disk of the control arrangement 1 is illustrated, said control means being connected to the shaft 15.

The exhaust-gas turbocharger 4 as per the illustration in FIG. 1 furthermore has an actuating device 17 which comprises an actuator 22 which, in the embodiment illustrated in FIG. 1, is fixed to the compressor housing 21 by way of a bracket 3. The actuator 22 may be in the form of a pneumatic control capsule or in the form of an electric actuator (E-actuator). As shown in FIG. 1, the actuator 22 has a regulating rod 13 which is connected to the outer lever 14 by way of a connecting piece 23. When the regulating rod 13 is moved longitudinally by the actuator 22, the lever 14 is pivoted, and thus the shaft 15 and the valve disk 18 fastened thereto are pivoted in order to open and close a wastegate valve opening that is not visible in FIG. 1.

As can be seen from a juxtaposition of FIGS. 2 to 4, the valve disk 18 of the control arrangement 1 is connected to the shaft 15, said valve disk and shaft being manufactured as separate components, wherein the shaft 15 is connected by way of its second end region 25 to the valve disk 18 by way of a connecting means 26.

As is furthermore shown in FIGS. 2 to 4, the connecting means 26 has a fork-shaped fixing region 27 which is arranged, preferably integrally, on the valve disk 18, which fixing region, in the state in which it is fixed to the shaft 15, engages around the end region 25 of the shaft 15.

As is shown in this regard in FIG. 3, it is the case in the particularly preferred embodiment in the figures that the second end region 25 is equipped with two flattened abutment surfaces 28 and 29 that are oriented parallel. The fork-shaped fixing region 27 is equipped with correspondingly formed counterpart surfaces 30 and 31 which bear against the abutment surfaces 28 and 29 in the assembled state.

It is furthermore the case in the particularly preferred embodiment that, in the region indicated by the arrow 32, a welded connection 32 is provided, the weld faces of which are preferably provided between the abovementioned surfaces 28 to 31 and also in the rounded transition region 43 between said surfaces.

As can also be seen from a juxtaposition of FIGS. 3 and 4, the fixing region 27 has two oppositely arranged fork regions 27A and 27B which bear counterpart surfaces 30 and 31. The fork region 27A has a rounded outer surface 27C, whereas the fork region 27B comprises an oblique surface 27D which is arranged at an angle α with respect to the surface of the valve disk 18. Both fork regions 27A and 27B comprise top surfaces 27E and 27F, respectively, which lie in a plane. The surfaces 27D and the surfaces 27F enclose an obtuse angle ß, whereas the angle α is an acute angle.

With this refinement, for the assembly of the valve disk 18 on the shaft 15, it is possible for the valve disk 18 to be pressed sealingly against the valve seat 33 and to be connected, preferably welded, to the shaft 15, in particular to the second end region 25 thereof, in this state. As discussed in the introduction, it is possible in this way for tolerances to be compensated and for the desired sealing action between valve disk 18 and sealing seat 33 to be realized.

Figure 5A:
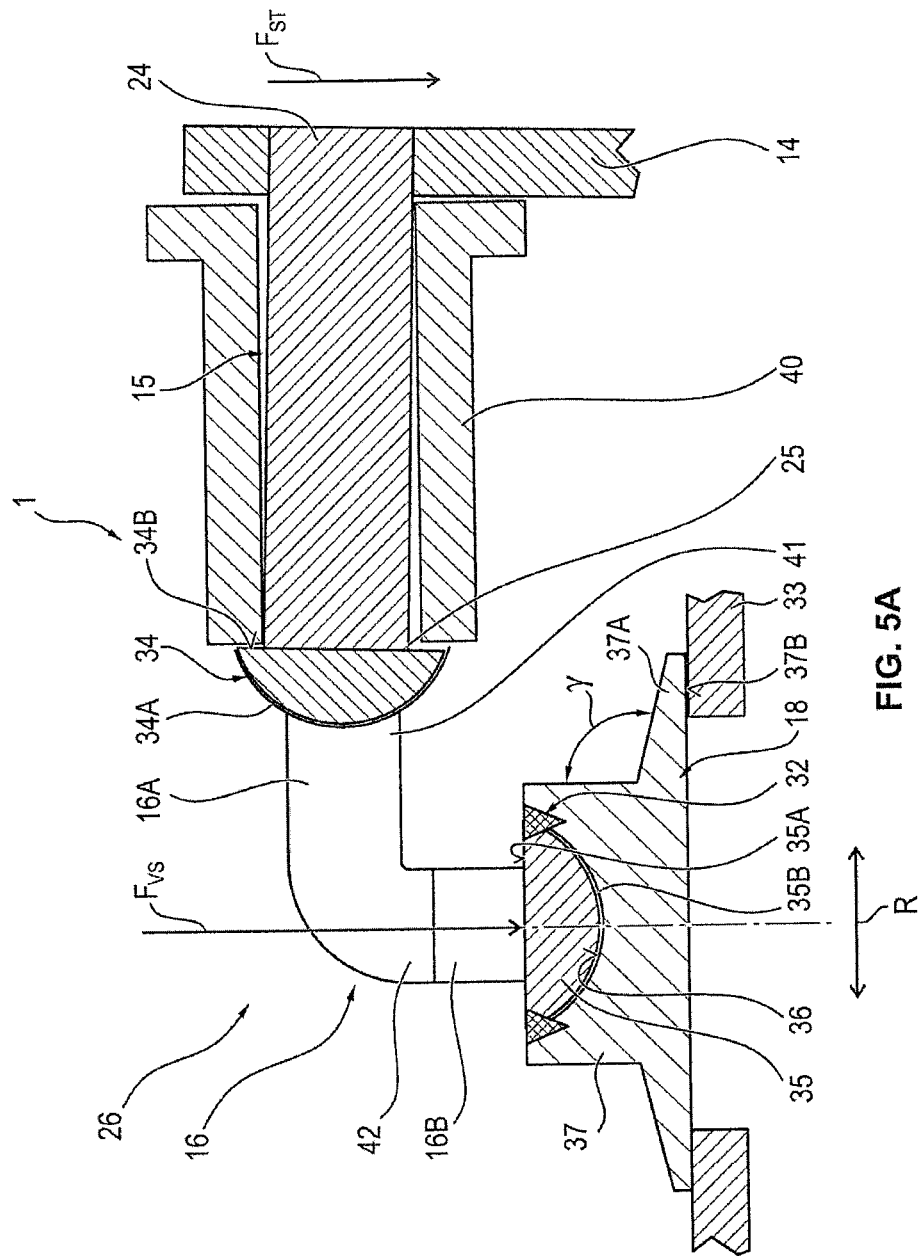
FIG. 5A shows a sectional illustration of a second embodiment of a control arrangement according to the invention.

FIG. 5A is an illustration of a further embodiment of the control arrangement 1 according to the invention, in which all elements that correspond to those in FIGS. 1 to 4 are identified by the same reference signs.

Accordingly, the control arrangement 1 as per the embodiment of FIG. 5A likewise has a shaft 15 which is guided by means of a bearing arrangement 40 in the charger housing (not illustrated) and the first end region 24, arranged outside the charger housing, of which is connected to an outer lever 14. As shown in FIG. 5A, it is the case in this embodiment that the bearing arrangement 40 extends over the entire length of the shaft 15, with the exception of the end regions 24 and 25 of the latter, which project out of the bearing arrangement.

In the embodiment illustrated in FIG. 5A, the second end region 25, arranged within the charger housing, is likewise connected, by way of the connecting means 26, to the valve disk 18. However, in the embodiment illustrated in FIG. 5A, the connecting means 26 has a multiplicity of components. These components include firstly a spherical segment 34 which has a circular base surface 34B which is connected to the second end region 25.

Furthermore, the spherical segment 34 has a spherical cap 34A which is adjoined, in the embodiment as per FIG. 5A, by an inner lever 16 with two lever sections 16A and 16B. The first lever section 16A is connected by way of one lever end 41 to the spherical cap 34A and by way of a second lever end 42 to the second lever section 16B.

In the embodiment of FIG. 5A, the second lever section 16B is adjoined by a second spherical segment 35. Said second spherical segment 35 is connected by way of its circular base surface 35A to the second lever section 16B. The second spherical segment 35 also has a spherical cap 35B, which is received entirely in a receiving space 36 of the valve disk 18.

In the embodiment illustrated in FIG. 5A, the receiving space 36 is arranged in a cylindrical connection part 37 of the valve disk 18. The connection part 37 has a valve disk region 37A which is widened in a radial direction R, which adjoins the connection part 37 at an obtuse angle γ, and which has a contact surface 37B which lies against the valve seat 33.

This configuration yields a particularly stable embodiment of the valve disk 18, which, even with fine dimensioning and associated low weight, yields surprisingly low inertial forces. Here, tests carried out within the context of the invention have shown that, despite very slender dimensioning, reduced wear of the control arrangement according to the invention is attained, which is surprising in particular as said control arrangement is used in extremely critical temperature ranges of over 900° and under alternating gas pressures, which is associated with high loading.

Furthermore, FIG. 5A shows, by way of the reference sign 32, a further element of the connecting means 26, which may for example be a welded connection, preferably a laser-welded connection, by means of which the spherical segment 35 can be connected to the valve disk 18.

This means that, in the case of the embodiment of the control arrangement 1 as per FIG. 5A, too, the valve disk 18 and the shaft 15 are separate components which can be connected to one another by way of the connecting means 26 described above. Thus, in this embodiment, too, it is possible, in order to improve the sealing action between the valve disk 18 and the valve seats 33, for the valve disk 18 to be held firmly with sealing action against the valve seat 33 during the assembly process, as indicated by the arrow $F_{VS}$. In this state, by virtue of the second spherical segment 35 being fixed in the receiving space 36, the connection between valve disk 18 and shaft 15 is produced, this being performed in particular by welding. In this way, it is advantageously possible in this embodiment, too, for tolerances to be compensated and a perfected sealing action to be attained.

In principle, it is possible for the shaft 15, the first spherical segment 34, the inner lever 16 with its two lever sections 16A and 16B in the example, and the second spherical segment 35 to be formed as a unipartite component.

It is however also possible for the stated elements to each be formed as individual components, which can be connected, in particular welded, to one another during the course of assembly.

It is additionally pointed out that the arrow $F_{ST}$ symbolizes the direction of the occurring stresses and the resulting tolerances, which can be compensated by way of the above-discussed assembly option for attaining a perfected sealing action.

In the case of the embodiment illustrated in FIG. 5A, the first lever section 16A is, owing to the arrangement of the valve disk 18, of cranked form, with a particularly preferred angle of the cranked form being 90°.

Furthermore, a second lever section 16B is provided which is of rectilinear form. With a corresponding arrangement, it would however also be possible for the second spherical segment 35 to directly adjoin the second end 42 of the first lever section 16A.

Furthermore, it would likewise be possible, with a corresponding orientation of the valve disk 18, for the first section 16A to be formed without a cranked configuration.

Figure 5B:
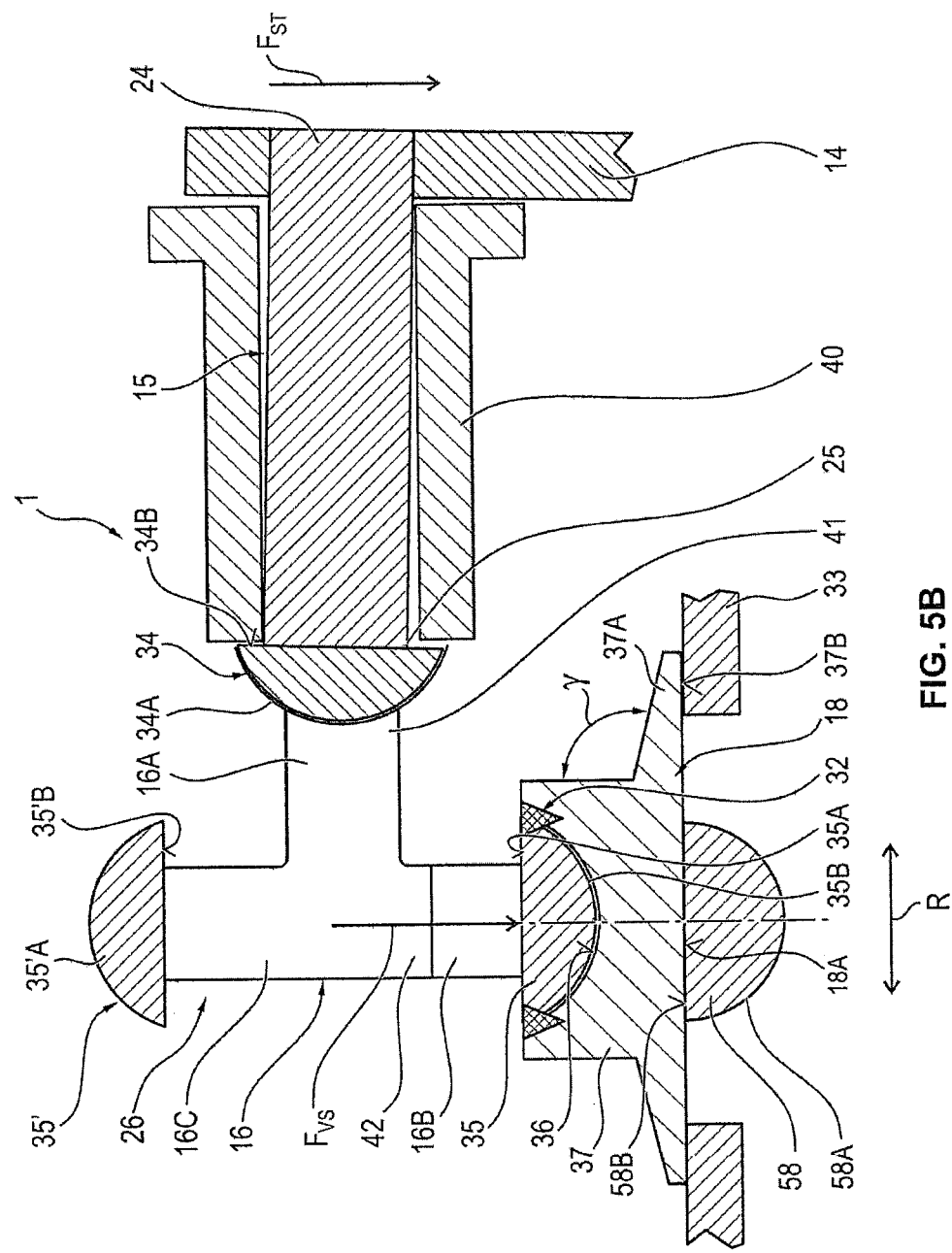
FIG. 5B shows a sectional illustration, corresponding to FIG. 5A, of an alternative design of the second embodiment of a control arrangement according to the invention.

FIG. 5B shows an alternative design of the second embodiment as per FIG. 5A. Therefore, all the features that correspond to the embodiment as per FIG. 5A are denoted by the same reference signs, such that in this regard, reference may be made to the description above.

The embodiment of the control arrangement as per FIG. 5B is characterized by the provision of a third lever section 16C which, corresponding to the lever section 16B, in this embodiment branches off at right angles from the first lever section 16A but in the opposite direction to the second section 16B, as can be readily seen from the diagrammatic illustration of FIG. 5B.

At its free end, the third lever section 16C is equipped with a third spherical segment 35' which is connected by way of its circular base surface 35'A to the free end of the third lever section 16C, for example by way of a welded connection. The third spherical segment 35' furthermore has a spherical cap 35'B, wherein the third spherical segment 35' in the particularly preferred embodiment illustrated in FIG. 5B is of identical form to the second spherical segment 35. Accordingly, the provision of the third lever section 16C with its third spherical segment 35' attached thereto, forms a counterweight with respect to the second lever section 16B and the spherical segment 35 attached thereto, which improves the acceleration and vibration characteristics of the control arrangement 1 as per the embodiment of FIG. 5B.

Furthermore, the control arrangement 1 as per the embodiment of FIG. 5B has a fourth spherical segment 58 which has a spherical cap 58A which projects into the wastegate opening when the valve disk 18, in the sealing position illustrated in FIG. 5B, lies against the valve seat 33. For this purpose, the spherical segment 58 is fastened, for example by way of a welded connection, preferably centrally by way of its circular base surface 58B to an in this case central surface region 18A of the valve disk 18. The provision of the spherical segment 58 furthermore increases the sealing action of the sealing seat between the valve disk 18 and the valve seat 33, and likewise improves the vibration characteristics, in particular under the action of pressure shock loads on the valve disk 18.

Figure 6:
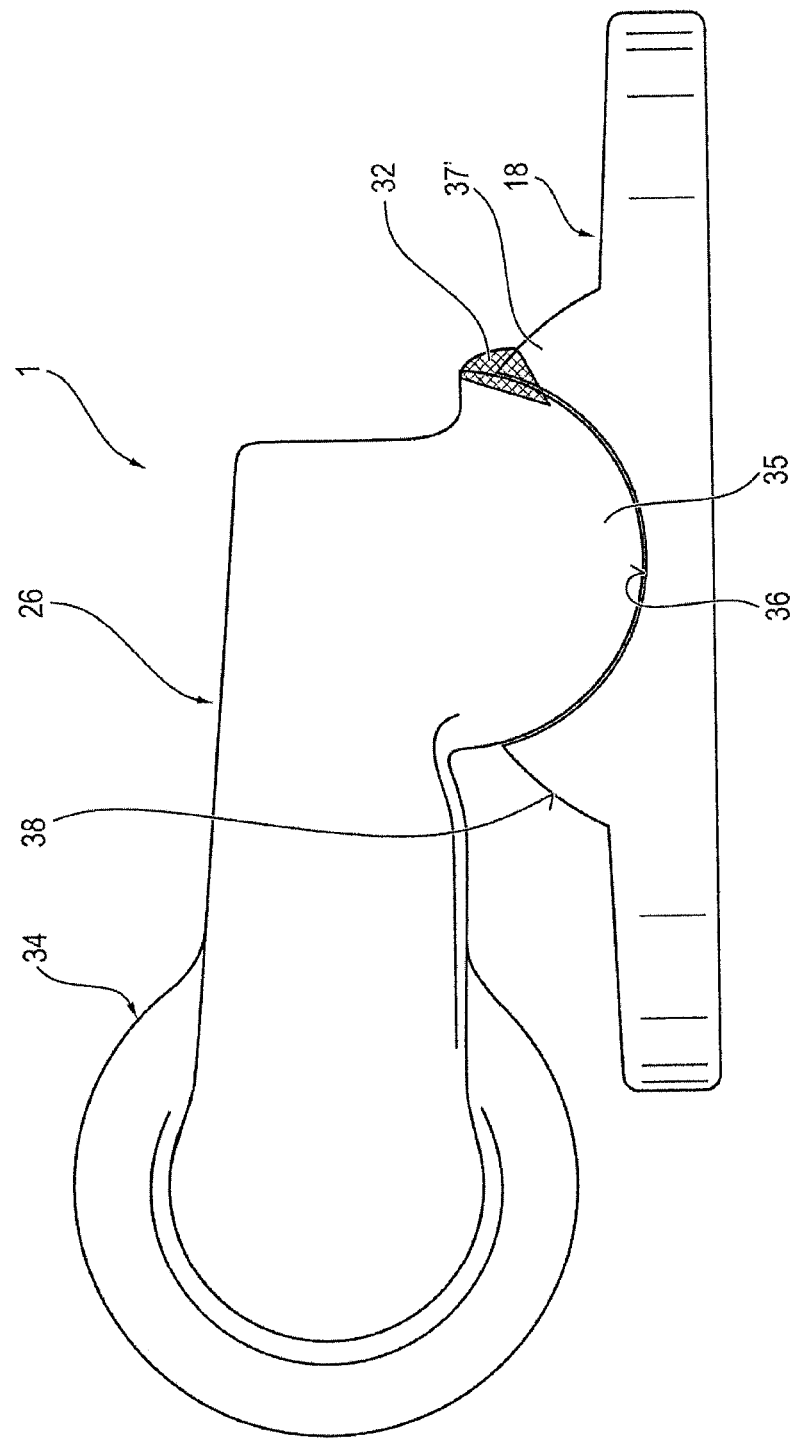
FIG. 6 shows a front view of a third embodiment of a control arrangement according to the invention.

The embodiment in FIG. 6 corresponds to that of FIG. 5, such that reference may be made to the description of FIG. 5.

In the embodiment illustrated in FIG. 6, however, the connection part 37' has a curved outer surface 38. This yields the advantage of a particularly compact design.

Figure 7:
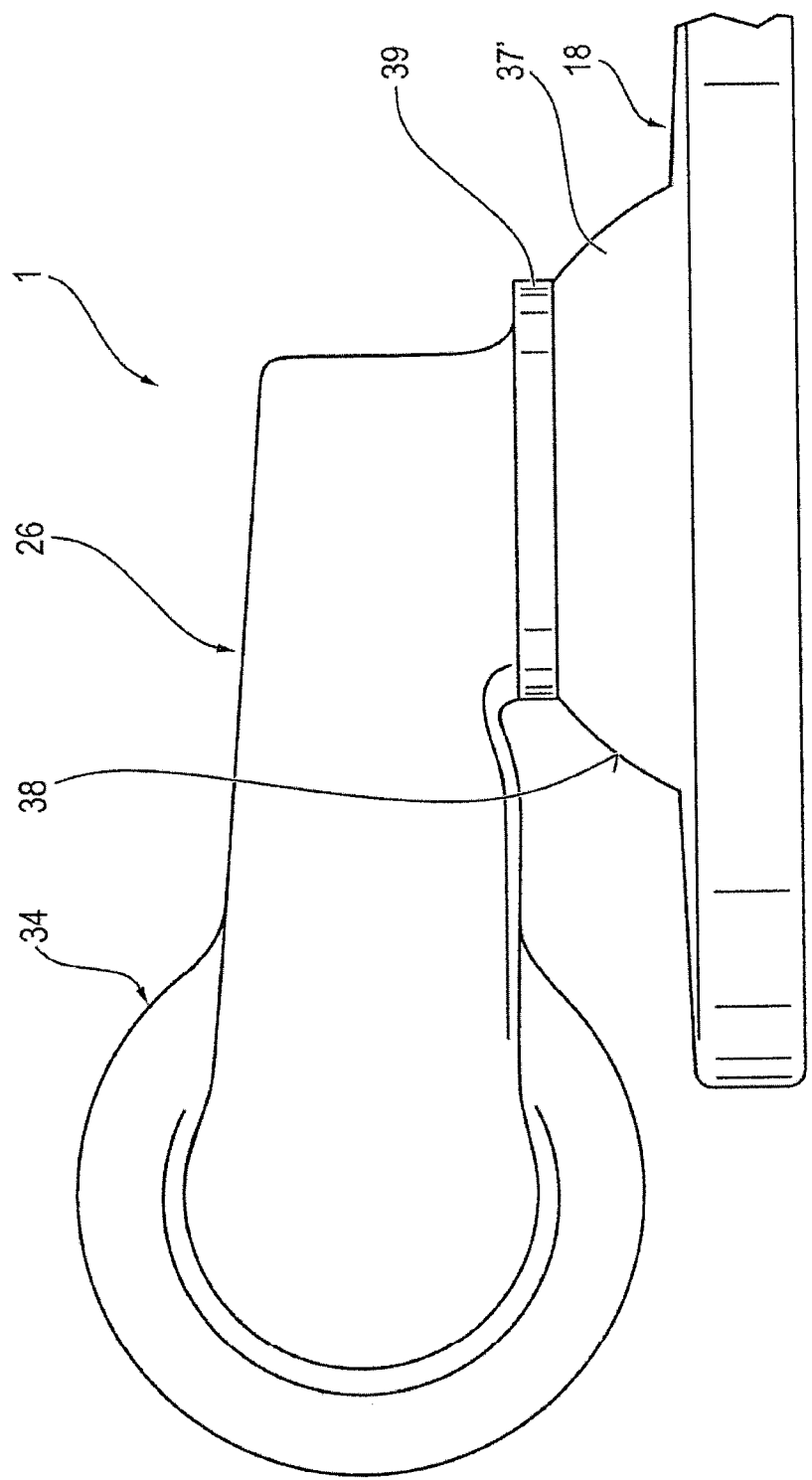
FIG. 7 shows an illustration, corresponding to FIG. 6, of a further embodiment of the control arrangement according to the invention.

The embodiment in FIG. 7 in turn corresponds to that of FIG. 5, such that in this regard, too, reference may be made to the embodiment as per FIG. 5.

In the embodiment as per FIG. 7, however, there is provided, as a further feature, a contact collar 39 which lies against the connection region 37'.

FIGS. 8A to 8E show the individual parts of a further embodiment of a control arrangement 43 according to the invention, which is shown in FIG. 9 in the assembled state.

Accordingly, the control arrangement 43 as per FIG. 8A has a shaft 44 with a cylindrical shaft body 45 which has an outer diameter dA45 which is constant over the entire length of the shaft body 45.

In the region of an end 54 of the shaft body 55 which, in the installed state, is an inner end of the shaft 44, the shaft body 45 is adjoined, substantially at right angles, by a connecting piece 46, which may be connected integrally to said shaft body or which may likewise be an individual part which can be connected, in particular by way of a welded connection, to the shaft body 45.

The connecting piece 46 bears, at its free end, a spherical segment 47 with an external diameter DA47.

FIG. 8B shows a valve disk 48 which can be connected to said spherical segment 47. For the connection, the valve disk 48 has a receiving recess 48B which is arranged in a spherical cap 48A and which has an internal diameter DI48B. Said internal diameter DI48B corresponds to the external diameter DA47, or is configured to be slightly larger than the outer diameter DA47.

FIG. 8C shows a bushing 50 that can be inserted into the shaft 44. For this purpose, the bushing 50 has an internal diameter DI50 and has an external diameter DA50 which is constant over the entire length of the bushing 50.

As shown in FIG. 8C, the bushing 50 has a passage recess 51, the length L51 and width B51 of which are adapted to the dimensioning of the connecting piece 46 such that, when the shaft 44 is inserted, said connecting piece can project through the passage recess 51, as can be seen from the illustration of FIG. 9.

The bushing 50 furthermore has a tongue 55 which has a length L55 slightly shorter than the length L51 and which, together with an opposite housing region 56 of the bushing 50, delimits a slot 52. As shown in FIG. 8C, the opening angle of said slot 52 is, owing to the tongue 55, smaller than the opening angle of the passage recess 51.

Finally, FIG. 8E shows a lever 53 which is an outer lever, which means that it is arranged outside the turbine housing when the control arrangement 43 is installed in the turbine housing. Said outer lever 53 may self-evidently be adapted to the respective dimensioning and the respective usage of the control arrangement 43, but is of conventional design with regard to its geometry and dimensioning. These explanations show that, in this embodiment, the connecting piece 46 and the spherical segment 47 form a connecting means 57.

A possible method for the assembly of a control arrangement of an exhaust-gas turbocharger 4 will be discussed below on the basis of the embodiment of the control arrangement 43 as per FIGS. 8A to 8E and 9. Accordingly, the individual constituent parts as per FIGS. 8A to 8E are firstly provided.

In a first assembly step, the bushing 50 is arranged in a turbine housing recess, wherein said bushing is preferably pressed into said recess. Subsequently, the shaft 44 is inserted into the bushing 50, such that the connecting piece 46 projects out of the bushing 50, as can be seen in FIG. 9.

The valve disk 48 is subsequently mounted onto a wastegate opening of the valve seat 33, as can be seen for example from the illustration of FIG. 5.

Subsequently, the intermediate piece 49 is pushed onto the end 54 and connected, preferably welded, thereto.

In the subsequent method step, an angle between the outer lever 53 and the shaft 44 relative to the valve disk 48 is adjusted, and the lever 53 is fixed, preferably welded, to the cylindrical shaft body 45 of the shaft 44. In this state, the lever 53 is pulled on in the direction of the valve disk 48, as has already been discussed with reference to FIG. 5. In this state, with the lever 43 being pulled on, the valve disk 48 is finally connected, preferably welded, to the spherical segment 47, for which purpose the spherical segment 47 is inserted into the receiving recess 48B. In the case of this connection, too, a welded connection is a particularly preferred embodiment.

Figure 10:
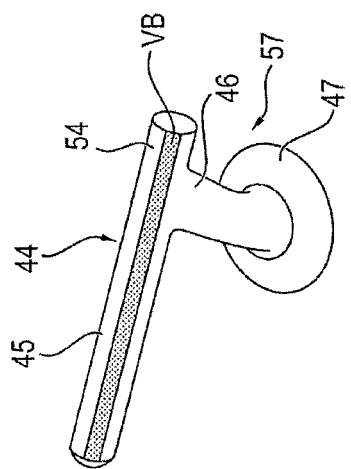
FIG. 10 shows an illustration, corresponding to FIG. 8A, of a shaft with a closing region illustrated in schematically simplified form.

FIG. 10 corresponds to the illustration of the shaft as per FIG. 8A, such that with regard to the features of the shaft 44, reference may be made to the above description of FIG. 8A. In FIG. 10, a region of wear is schematically symbolized by the surface region FB, which extends at least substantially over the entire length of the shaft body 45. Tests carried out within the context of the invention have shown that said region of wear VB, which as stated extends substantially over the entire length of the shaft body 45, arises during operation but surprisingly has no influence on the sealing action of the sealing seat between the valve disk 18 and the valve seat 33. This is the case in particular if the region of wear VB is oriented at least substantially parallel to the valve disk surface.

Figure 11:
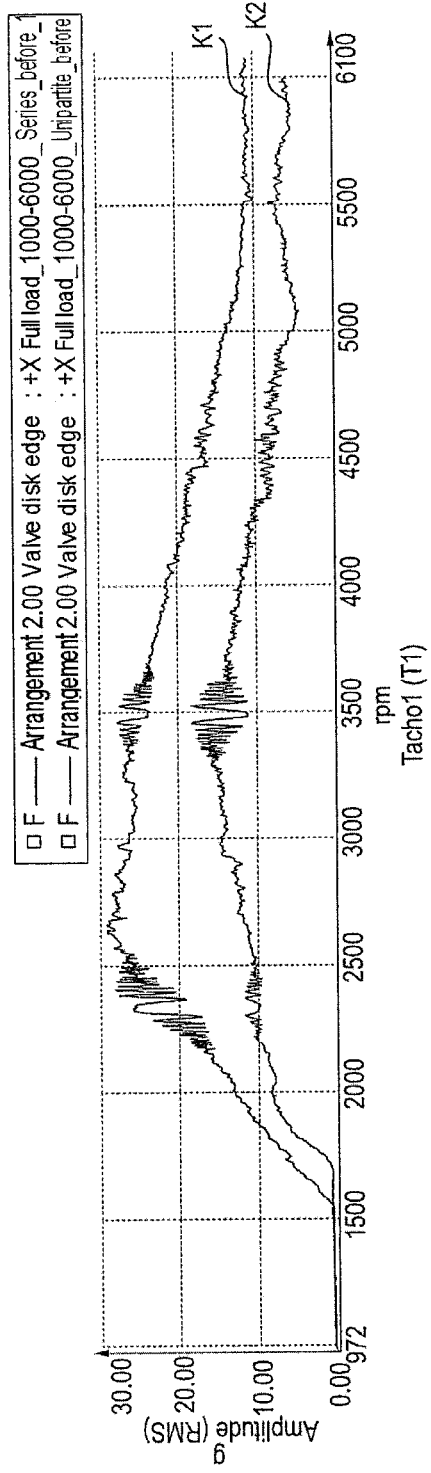
FIG. 11 shows a coordinate system with two curves for illustrating the acceleration behavior of a control arrangement according to the prior art and of an embodiment of the control arrangement according to the invention.

FIG. 11 shows two curves K1 and K2 illustrated in an X-Y coordinate system, with the acceleration plotted on the X axis and the amplitude plotted on the Y axis. Here, the curve K1 represents a valve disk according to the prior art, for example WO 2014/011468 A1, whereas the curve K2 represents an embodiment of a control arrangement according to the invention. The comparison between the two curves K1 and K2 clearly shows that the control arrangement according to the invention exhibits smoother acceleration and vibration characteristics than the control arrangement according to the prior art, wherein said smoother vibration characteristics have an advantageous effect on the function of the control arrangement according to the invention.

The method for the assembly of a control arrangement of an exhaust-gas turbocharger 4 in accordance with the invention will be discussed below with reference to FIGS. 12a-12f. The below method can be applied for the embodiments of the control arrangement disclosed in connection with FIGS. 1 to 10 as well as to slide gate VTG, slide cylinder VTG, rotary vane VTG, and other types of VTG.

Figure 12A:
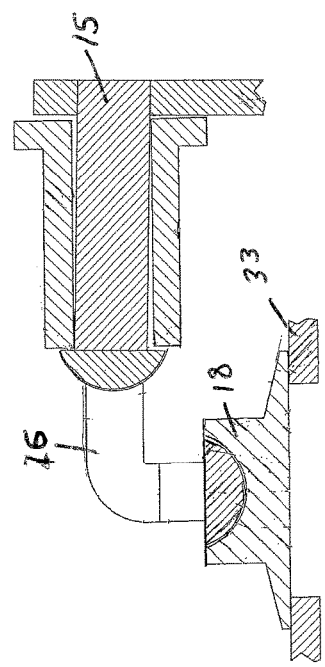
FIGS. 12a-12f show the process steps for the method according to the invention on the basis of a wastegate as example.
Figure 12B:
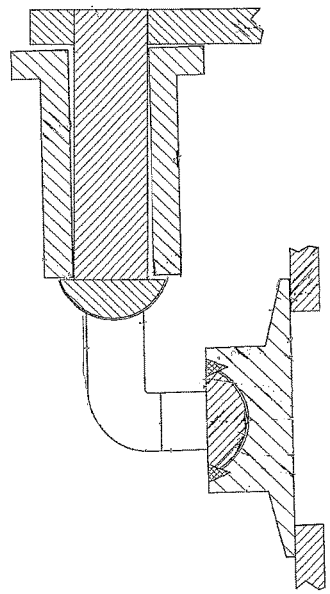
Figure 12C:
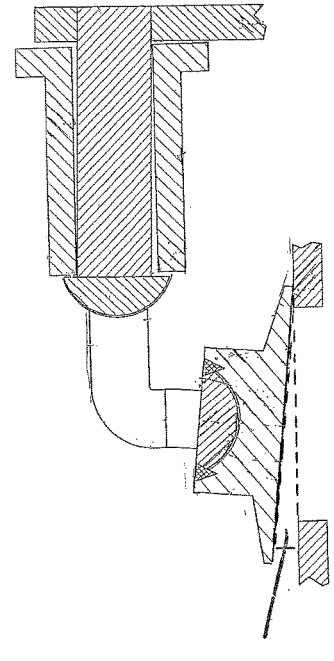
Figure 12D:
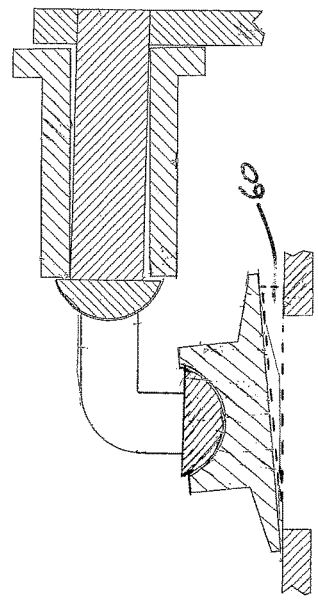
Figure 12E:
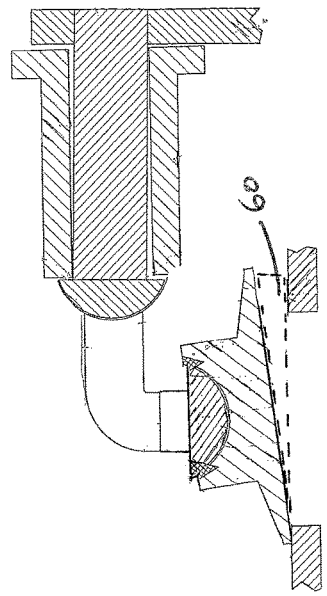
Figure 12F:
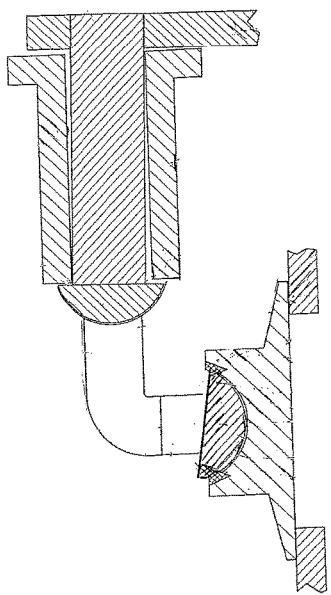

Subsequent to making the first turbocharger as illustrated in FIGS. 12a-12c—without distance element—in the subsequent steps illustrated in FIGS. 12d-12f the method of manufacture of the second and subsequent "corrected" turbocharger(s) according to the invention is described.

In FIGS. 12a-12f, unnecessary reference numbers are omitted for ease of seeing the changes in alignment.

In a first assembly step shown in FIG. 12a, shaft 15 is inserted through a turbine housing recess and valve disk 18 is placed against valve seat 33. Connecting piece 26 is provided, wherein connecting piece 26 is linked to the shaft 15.

In the next method step, a first end of connecting piece 26 is brought into contact with valve disc 18 and a force is applied on the connecting piece 26 to press valve disc 18 against valve seat 33.

In the next method step illustrated in FIG. 12b, connecting piece 26 is connected, preferably welded, to shaft 15.

Next, as illustrated in FIG. 12c, the first turbocharger is heated to operating temperature and the geometry of the gap or offset 61 between the valve disk 18 and the valve seat 33 is determined.

Now, a distance element 60 equal and opposite to the geometry of the gap 61 is manufactured. The distance element 60 is placed on top of valve seat 33 in a second turbocharger being manufactured. The unwelded turbocharger boost control device components of FIG. 12d are identical to those shown in FIG. 12a, except that the orientation of the valve disk 18 is relative to the valve seat 33 and connecting piece 26 is geometrically offset with the distance element.

In the next step illustrated in FIG. 12e the valve disk 18 is welded to the connecting piece 26 in the "cold" turbocharger, in a manner similar to that shown in FIG. 12b, except that the orientation of the valve disk 18 is relative to the valve seat 33 and connecting piece 26 is geometrically offset with the distance element.

After the turbocharger with boost control device shown in FIG. 12e is brought up to operating temperature, the thermal deviation illustrated in FIG. 12c is offset by the "correction" introduced into the boost control device of FIG. 12d-e by distance element 60. As a result, with the two deflections canceling each other out, the valve seat 18 seals perfectly against valve seat 33 when the second and subsequent turbochargers are brought up to operating temperature.

The method may further comprise the step of inserting a bushing 40 into the turbine housing recess before inserting shaft 15 so that shaft 15 is placed into bushing 40 when inserting shaft 15 through the turbine housing recess.

As outlined with respect to several of the above described embodiments, the connecting piece 26 and the shaft 15 may be individual components. In this case the method comprises the further step of fixing, preferably welding, connecting piece 26 to one end 25 of shaft 15, preferably before applying the force on the connecting piece 26. Alternatively, the connecting piece 26 and the shaft 15 are formed as a unipartite component.

The first end of connecting piece 26 may comprise a spherical segment 35 that is arranged in a respective receiving space 36 in the valve disc 18, see FIGS. 5A, 5B and 6. The connecting piece 26 and the spherical segment 35 may be individual components. In this case, the method comprises the step of fixing, preferably welding, connecting piece 26 to spherical segment 35 before applying the force on the connecting piece 26. Alternatively, connecting piece 26 and spherical segment 35 may be formed as a unipartite component. Receiving space 36 may be arranged in a cylindrical connection part 37 of the valve disc 18 as shown in FIGS. 5A and 5B. Alternatively, receiving space 36 may be arranged in spherical cap 48A of valve disc 48 as shown in FIGS. 8B and 9.

The method may further comprise the step of adjusting an angle between outer lever 14 and shaft 15 relative to the valve disk 18. This is preferably done before connecting valve disk 18 to connecting piece 26. The outer lever 14 may be fastened, preferably welded, to shaft 15 after adjusting the angle between outer lever 14 and shaft 15, preferably before connecting valve disk 18 to connecting piece 26. Applying a force on the connecting piece 26 may comprise pulling on the lever 14 in the closing direction of the valve disk 18.

The method may further comprise the step of determining characteristics of the distance element 60 based on a turbine housing geometry, the applied force and/or a type of welding process. The characteristics of the distance element 60 comprise a geometric form of the distance element 60, dimensions of the distance element 60 including lateral dimensions and thickness and/or a material or material composition of the distance element 60.

In embodiments, the distance element 60 is shaped and arranged so that it fully or partly prevents direct contact between the valve seat 33 and a respective opposing surface of the valve disk 18. The distance element 60 may, for example, have a disc-shaped or a ring-shaped form. In embodiments, the distance element 60 may have the form of a segment of a disc or a segment of a ring. In this case, the distance element 60 covers only a portion of the valve seat 33 or the valve disk 18. In other words, the distance element 60 can be provided as a full distance element 60, covering the entire valve seat 33 or the entire valve disc 18. Alternatively, the distance element 60 can be provided as a partial distance element 60, covering only a portion of the valve seat 33 or the valve disk 18. This can be advantageous for correcting a misalignment of the rotation axis of shaft 15 in the turbine housing recess or the bushing 40. The thickness of the distance element 60 may vary about at least a portion of a circumference of the distance element 60. In particular, the distance element 60 may have a tapered form. Alternatively, the distance element 60 may have a flat form.

In embodiments, the distance element 60 may comprise plastic and/or paper. The distance element 60 may, for example, be entirely made of paper or of a plastic foil.

In embodiments, the distance element 60 may be a separate component that is attached to the valve disk 18, or that is attached to the valve seat 33. The distance element 60 may be glued to the valve disk 18 or the valve seat 33. In particular embodiments, the distance element 60 may be self-adhesive. In other words, the distance element 60 can be provided as a sticker comprising a layer of adhesive material.

In embodiments the distance element 60 may be reusable for the assembly of multiple control arrangements. The distance element 60 can be removed from the valve seat 22 or the valve disk 18 after assembly. Alternatively, the distance element 60 is not removed after assembly and burns when the control arrangement is put into operation in a turbocharger.

As an alternative to a separate component, the distance element 60 may be realized in form of a coating that is applied to the valve seat 33 and/or the valve disk 18.

In an alternative embodiment of the invention, as depicted in FIGS. 13a and 13b, the flow of exhaust gas to the turbine wheel 170 is controlled by the rotation of a pivoting transverse divider wall 127 which is driven by an actuator driving an actuator rod 114 through a clevis 124. A clevis pin 125 transmits the actuator drive though an actuation arm 173, which in turn rotates and actuator shaft 172 about an axis 130.

The pivoting transverse divider wall 127 has a leading edge 128 and a trailing edge 129 and rotates about the axis 130 of the actuator shaft 172. For the sake of clarity the extreme positions of the actuation arm 173 are marked as "A" and "B". In position "B" the pivoting transverse divider wall 127 has its leading edge 128 close to the center of the volute cross-sectional area, thus effectively directly the incoming flow of exhaust gas both under and over the transverse divider wall. This splitting of the exhaust flow forces the gas on the outside of the transverse divider wall to flow to the turbine wheel only downstream of the trailing edge 129 of the pivoting transverse divider wall 127. In this position the trailing edge 129 of the pivoting transverse divider wall 127 is also close to the center of the volute.

In the method according to the invention, the pivoting transverse divider wall 127 is assembled in the precisely desired (soli) position in a cold turbocharger. The turbocharger is then brought up to operating temperature and the offset between desired (soll) and actual (ist) position of the pivoting transverse divider wall 127 is measured. A distance element is manufactured to introduce a corrective offset to the pivoting transverse divider wall 127. Then, in second and subsequent turbochargers, the cold turbocharger is manufactured with corrective distance element between turbine housing and pivoting transverse divider wall 127. The second and subsequent turbochargers exhibit no thermal induced offset of the pivoting transverse divider wall 127 when the turbocharger is brought up to operating temperature.

Figure 14:
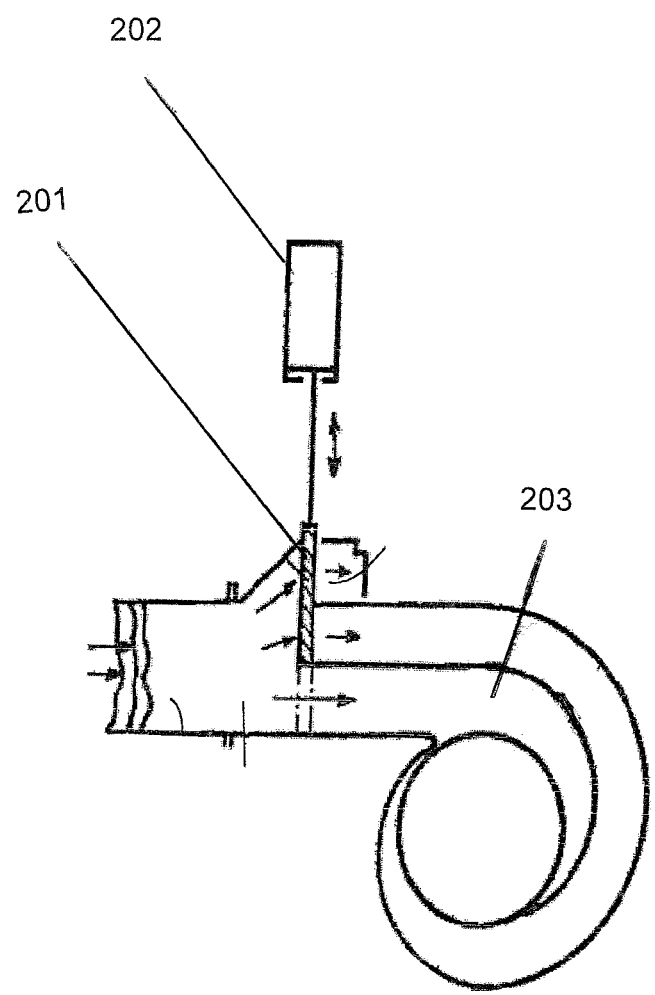
FIG. 14 illustrates a slide gate type embodiment of the invention.

FIG. 14 illustrates a slide gate type VTG mechanism with a slide gate 201 actuated by an actuator 202. A first turbocharger 203 is assembled cold. The first turbocharger is heated to operating temperature. The offset between slide gate 201 desired (soll) and actual (ist) position is determined. A distance element is produced to offset the slide gate in an equal and opposite direction. A second and subsequent turbocharger are manufactured with the slide gate offset by the distance element. The second and subsequent turbochargers, when brought to operating temperature, exhibit slide gate position precisely as desired since the thermal deformation and the corrective deformation offset each other.

The present disclosure includes that contained in the appended claims, as well as that of the foregoing description and the references mentioned above which are incorporated by reference herein. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method for assembling a control arrangement of an exhaust-gas turbocharger, having the following method steps:
    manufacturing, at room temperature, a first turbocharger including an actuator outside a turbine housing, a boost control device inside a turbine housing, and a shaft for transmitting force from the actuator through the turbine housing to the boost control device,
    heating the thus manufactured first turbocharger to a turbocharger operating temperature,
    determining the geometry of any gap or deviation between an element of the boost control device in the actual position and the target position in the heated turbocharger,
    producing a distance element which will displace the element of the boost control device an equal and opposite displacement in the direction or orientation opposite to the gap or deviation,
    manufacturing at least one subsequent turbocharger having the same components as the first turbocharger, including inserting the distance element between the turbine housing and boost control device, holding the boost control device against the distance element, and connecting the thus held boost control device to the shaft.

2. The method of claim 1, wherein the distance element comprises at least one of plastic and paper.

3. The method of claim 1, wherein multiple subsequent turbochargers are manufactured, and wherein said distance element is used for the assembly of multiple control arrangements used in said multiple subsequent turbochargers.

4. A method for assembling a wastegate boost control arrangement of an exhaust-gas turbocharger, having the following method steps:
    manufacturing, at room temperature, a first turbocharger with wastegate arrangement by a process including assembling an actuator outside a turbine housing, a wastegate valve including a wastegate valve disk for seating against a wastegate valve seat inside the turbine housing, and a shaft for transmitting force from the actuator through the turbine housing to the wastegate valve disk, holding the wastegate valve disk with sealing action against the wastegate valve seat, and connecting the thus held wastegate valve disk to the shaft,
    heating the thus manufactured first turbocharger to an operating temperature,
    determining the geometry of any gap between the wastegate valve seat and wastegate valve disk at the operating temperature,
    producing a distance element which will position the wastegate valve disk relative to the wastegate valve seat equal and opposite to the determined gap,
    manufacturing at least one subsequent turbocharger having the same components as the first turbocharger, further including inserting the distance element between the wastegate valve seat and the wastegate valve disk, holding the wastegate valve disk with sealing action against the distance element, and connecting the thus held valve disk to the shaft.

5. The method of claim 4, wherein the distance element has a disc-shaped or a ring-shaped form.

6. The method of claim 4, wherein the distance element has a form of a segment of a disc or a segment of a ring.

7. The method of claim 4, wherein the thickness of the distance element varies about at least a portion of a circumference of the distance element.

8. The method of claim 4, wherein the distance element has a flat form.

9. The method of claim 4, wherein the distance element comprises at least one of plastic and paper.

10. The method of claim 4, wherein the distance element is glued to the wastegate valve disk or the wastegate valve seat.

11. The method of claim 4, wherein multiple subsequent turbochargers are manufactured, and wherein said distance element is used for the assembly of multiple control arrangements used in said multiple subsequent turbochargers.

12. The method of claim 4, wherein the distance element comprises a coating applied to at least one of said wastegate valve seat and the wastegate valve disk.

13. A method for assembling a VTG boost control device of an exhaust-gas turbocharger, having the following method steps:
    assembling, at room temperature, a first turbocharger including an actuator outside a turbine housing, a VTG boost control device comprising at least one rotating vane or a slide gate as boost control mechanism inside the turbocharger housing, the VTG boost control device having a minimum open position or a closed position, and a shaft for transmitting force from the actuator through the turbine housing to the VTG boost control device,
    applying, at room temperature, actuating force to position the at least one rotating vane or slide gate of the VTG boost control device to the minimum open position or the closed position, and connecting the actuating shaft to the VTG boost control device at least one rotating vane or slide gate,
    heating the thus manufactured first turbocharger to an operating temperature,
    determining the geometry of any gap between the VTG boost control device at least one rotating vane or slide gate in the actual position and the target position in the heated turbocharger,
    producing a distance element which when placed between the VTG boost control device at least one rotating vane or slide gate and turbine housing will orient the VTG boost control device at least one rotating vane or slide gate an equal and opposite distance or orientation to the determined gap,
    manufacturing at least one subsequent turbocharger having the same components as the first turbocharger, said manufacturing including assembling at room temperature, the VTG boost control device while inserting the distance element between the at least one rotating vane and turbine housing or the slide gate and turbine housing, holding the VTG boost control device against the distance element, and
    connecting the thus held distance element to the shaft.

14. The method of claim 13, wherein the distance element comprises at least one of plastic and paper.

15. The method of claim 13, wherein the distance element is glued to the at least one rotating vane, to the slide gate or to the turbine housing.

16. The method of claim 13, wherein multiple subsequent turbochargers are manufactured, and wherein said distance element is used for the assembly of multiple VTG boost control devices used in said multiple subsequent turbochargers.

17. The method of claim 13, wherein the distance element comprises a coating applied to at least one of the at least one rotating vane, the slide gate or the turbine housing.

18. The method as in claim 1, wherein said connecting is welding.

19. The method as in claim 4, wherein said connecting is welding.

20. The method as in claim 13, wherein said connecting is welding.

* * * * *